United States Patent [19]

Spears

[11] Patent Number: 5,092,648
[45] Date of Patent: Mar. 3, 1992

[54] AIR DEFLECTOR SYSTEM FOR TRACTOR-TRAILERS AND CONTROLS THEREFOR

[76] Inventor: Dan E. Spears, 3515 Westfield Dr., Brandon, Fla. 33511

[21] Appl. No.: 545,989

[22] Filed: Jun. 29, 1990

Related U.S. Application Data

[63] Continuation-in-part of Ser. No. 392,019, Aug. 10, 1989, abandoned.

[51] Int. Cl.⁵ .............................................. B62D 35/00
[52] U.S. Cl. ................................. 296/180.3; 296/180.5
[58] Field of Search ............... 296/180.1, 180.2, 180.3, 296/180.5

[56] References Cited

U.S. PATENT DOCUMENTS

| | | | |
|---|---|---|---|
| 2,863,695 | 12/1958 | Stamm | 296/180.2 |
| 4,214,786 | 7/1980 | Morrison | 296/180.2 |
| 4,607,874 | 8/1986 | Peairs | 296/180.3 |
| 4,693,506 | 9/1987 | Massengill | 296/180.3 |
| 4,824,165 | 4/1989 | Fry | 296/180.5 |
| 4,867,499 | 9/1989 | Stephan et al. | 296/180.1 |

FOREIGN PATENT DOCUMENTS

| | | | |
|---|---|---|---|
| 150582 | 9/1981 | German Democratic Rep. | 296/180.3 |
| 151723 | 11/1981 | German Democratic Rep. | 296/180.2 |
| 556636 | 2/1957 | Italy | 296/180.1 |
| 673517 | 7/1979 | U.S.S.R. | 296/180.3 |
| 1526860 | 10/1978 | United Kingdom | 296/180.5 |

*Primary Examiner*—Margaret A. Focarino
*Assistant Examiner*—Gary C. Hoge

[57] ABSTRACT

A plurality of spaced gates in the airflow control system on top of the tractor cab opens up to permit a flow of air to impinge on the front face of the trailer to exert a braking force to augment the braking force exerted by the wheel brakes to slow down the tractor-trailer assembly.

8 Claims, 5 Drawing Sheets

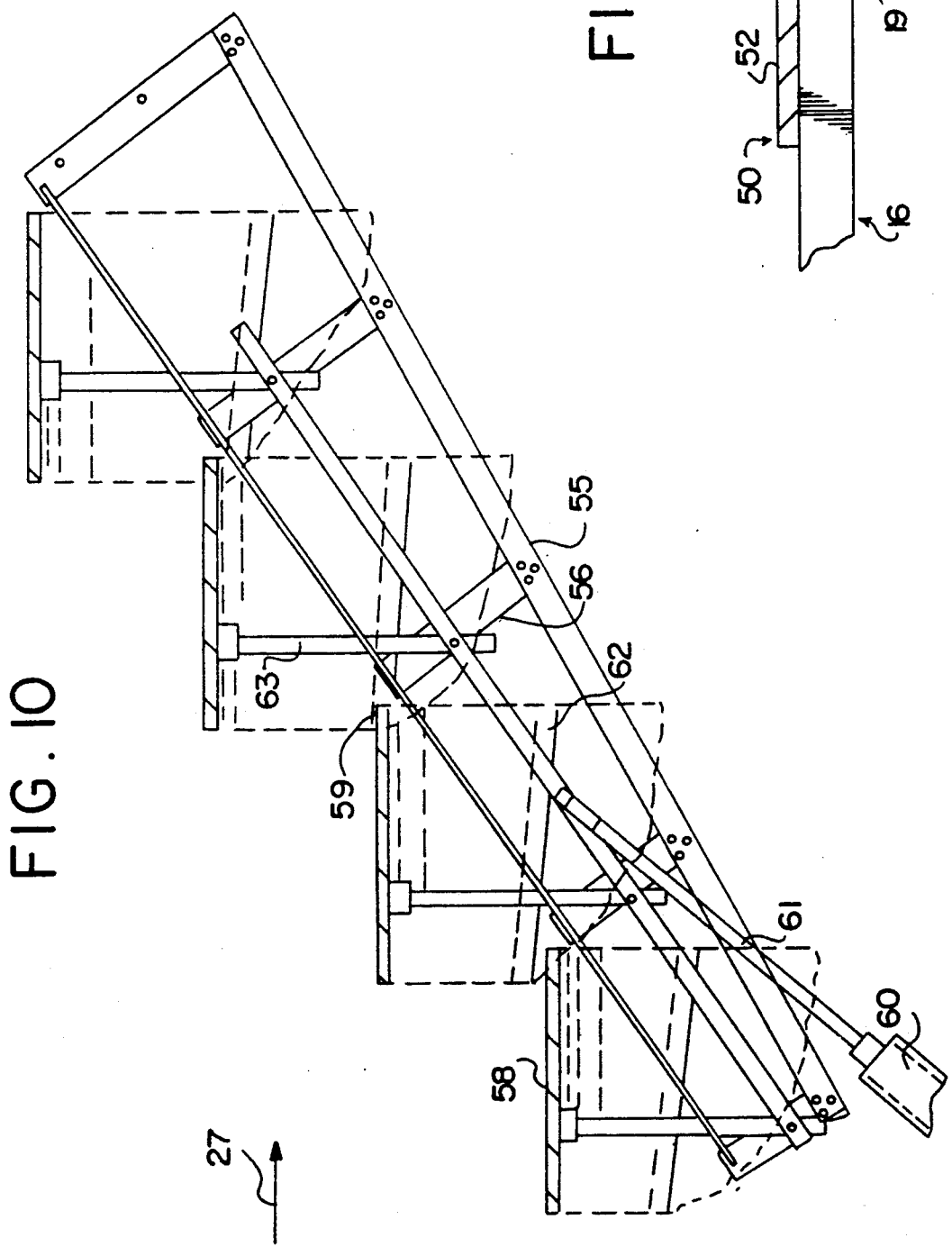

AIR DEFLECTOR SYSTEM FOR TRACTOR-TRAILERS AND CONTROLS THEREFOR

This is a continuation-in-part of application Ser. No. 07/392,019, filed Aug. 10, 1989, now abandoned.

BACKGROUND OF THE INVENTION

With the inception of the tractor-trailer vehicles the tractor vehicle was relatively low to the ground as compared with the trailer unit which was high and boxy to include as much volume as the law would permit for the carrying of cargo. As a result, the air flow impinging on the trailer at high speeds exerts a high degree of force, particularly if a strong head wind existed. This coupled with long down hill grades is proving to be a dangerous situation because more braking effort is now required to slow down or stop these vehicles than was required before these improvements were made.

1. Field of the Invention

Broadly stated this invention pertains to the control and deflection of the passing air flowing over and around the tractor-trailer vehicle to cause it to flow over and around the trailer with the least degree of deflection and resistance at road speeds. As soon as the brakes of the vehicle are applied the air deflecting doors open up, and the inlet doors open to deflect and redirect the air to impinge on the substantially flat front surface of the trailer vehicle to increase the resistance applied by the brakes by slowing down the vehicle. This imposes a substantial resistance on the trailer vehicles forward momentum thereby increasing the braking effect that must be applied to control the speed of the vehicle at the higher road speeds.

2. DESCRIPTION OF THE RELATED ART

Efforts have been made to utilize the air flow striking the trailer unit to reduce the speed of the rig. One of the early developments seeking to reduce the braking force required is Stamm U.S. Pat. No. 2,863,695 of 1958 in which an effort was made to deflect and guide the air flow from the tractor unit to the trailer unit to change its course and direct air to flow to the trailer mounted element 40 on top of the trailer. This effort was more theoretical than practical because of the long vertical step, as seen in FIG. 1, between the top of the cab on the tractor vehicle to the top of the trailer unit, a distance that was entirely too high to be accomplished in the short horizontal distance available.

Peairs U.S. Pat. No. 4,607,874 of 1986 had a shield 10 mounted transversely of the top of the tractor cab which could be moved angularly depending on the speed at which the vehicle is driven to deflect the air flow to project it over the top of the trailer 14 to reduce the resistance involved.

SUMMARY OF THE INVENTION

Briefly summarized this invention pertains to the use of a multi-gated fairing adapted to be positioned on the cab of the tractor vehicle forwardly of the trailer vehicle to streamline the flow of air to the trailer vehicle to flow over the trailer with the minimum of disturbance and resistance when the fairing is closed, and wherein when the fairing opens up upon the application of the brakes to permit the air to impact on the front face of the trailer to cooperate with the wheel brakes to decelerate the vehicle.

Another important feature of my invention is to provide an air deflector mounting bracket having a plurality of hingedly mounted front and side gates mounted in sturdily built mounting structure capable of fitting a wide range of tractor units.

BRIEF DESCRIPTION OF THE DRAWINGS

FIG. 10 is a sectional view illustrating the means for actuating the movable gates in the air deflector mounting bracket, and FIG. 11 is a sectional view illustrating a position of the movable gate actuating mechanism.

DESCRIPTION OF THE PREFERRED EMBODIMENT

Figure 1:
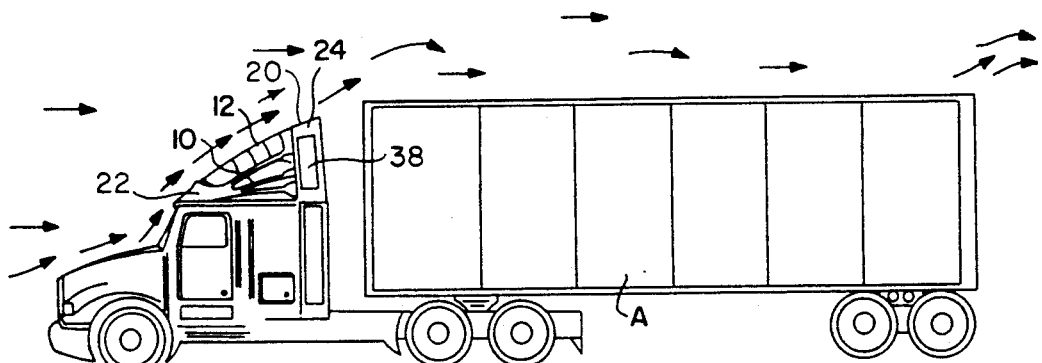
FIG. 1 is a side elevational view of a tractor-trailer vehicle with the air deflector door panels closed.
Figure 2:
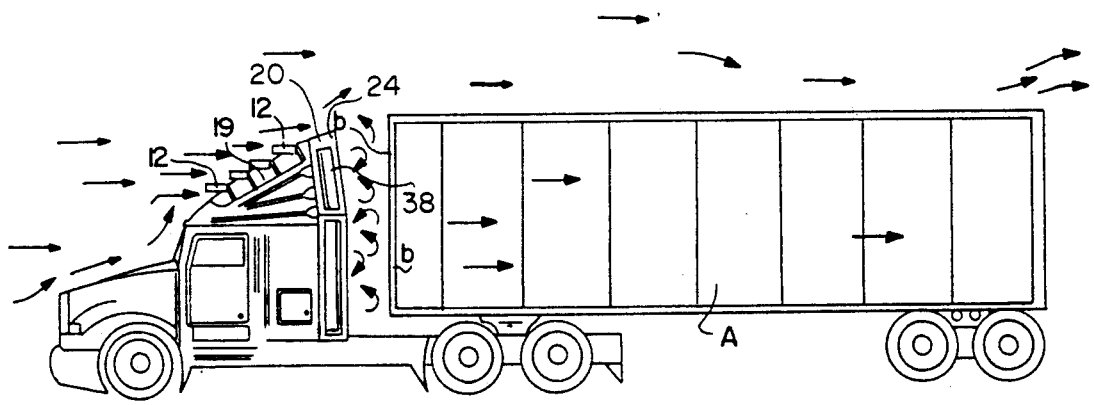
FIG. 2 is a side elevational view of the tractor-trailer vehicle illustrated in FIG. 1 with the door bracket opened.
Figure 3:
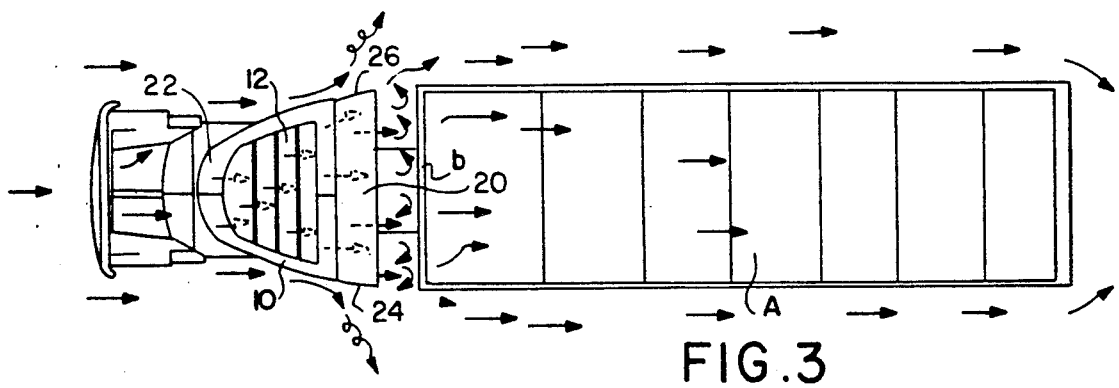
FIG. 3 is a plan view of the tractor-trailer vehicle illustrated in FIGS. 1 and 2 with the air deflector variable door panels open.

A generally triangular shaped mounting bracket 10 is adapted to be positioned on top of the cab of the truck unit illustrated in FIGS. 1, 2 and 3 of a vehicle tractor to deflect the air passing the truck, and to minimize the resistance of the air flow as the air reaches and passes the trailer unit having a substantially flat vertical face b of the trailer unit of FIGS. 1, 2 and 3 as the air is deflected to flow around the trailer unit A of FIGS. 1, 2 and 3.

The central part of the mounting bracket 10 has a plurality of hingedly mounted gates 12, as shown in FIG. 1, which upon application of the brakes of the vehicle are hinged by actuation of the piston rod 61 in the cylinder 60 of FIG. 10 to actuate the links 62 and 63 to actuate the doors 12 at the rear or upper ends of the gates to pivot forwardly to open up the opening 19 as shown in FIG. 2 in the mounting bracket 10 to permit the wind developed by the momentum of the vehicle to impinge directly with full force on the substantially flat front face b of the trailer. At the same time the gates 38 hinged at the back in the side walls 24 and 26 as illustrated in FIGS. 1 and 2 of the mounting bracket 10 open up to admit more air to impinge on the front face b of the trailer unit to increase the braking effort by the air flowing by the vehicle.

The pivotally mounted gates 12 open up to admit air to flow therethrough to impinge directly on the front face b of the trailer to exert a braking force thereon. By the use of this construction one of the important advantages of Applicant's invention is achieved, that is the streamlining of the flow of air passing over the mounting bracket to reduce the turbulence of the air as it flows from the tractor unit to the trailer unit without the turbulence of the air that develops if Applicant's fairing is not encountered.

Figure 4:
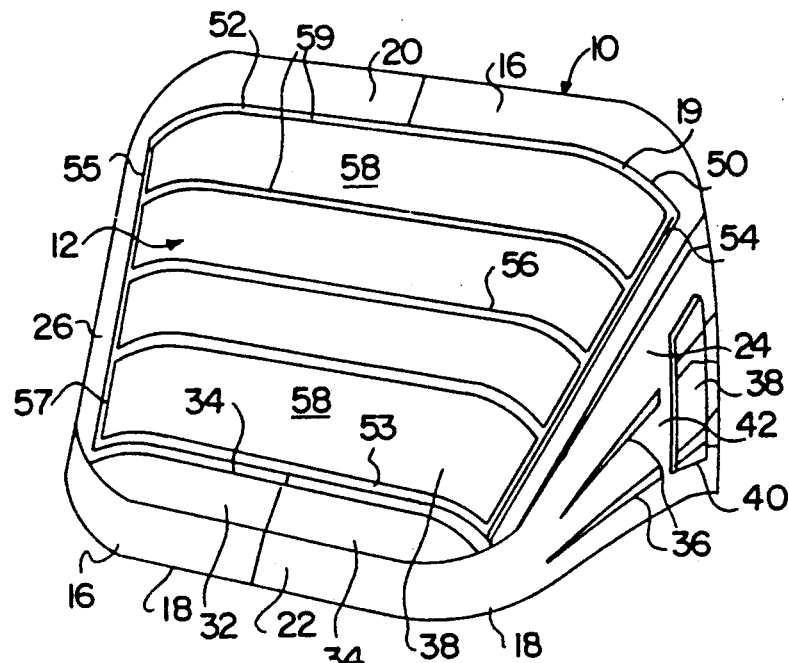
FIG. 4 is a front quarter perspective view of an air deflector mounting bracket shown in the closed position and embodying the present invention.
Figure 5:
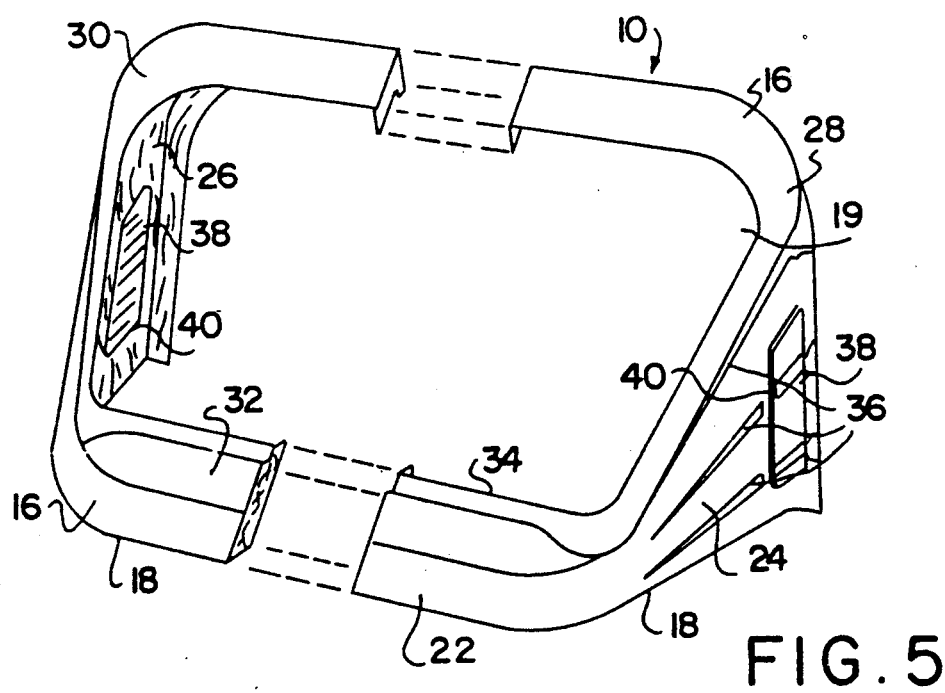
FIG. 5 is a perspective exploded view in quarter front elevation of the mounting bracket embodying the present invention.
Figure 6:
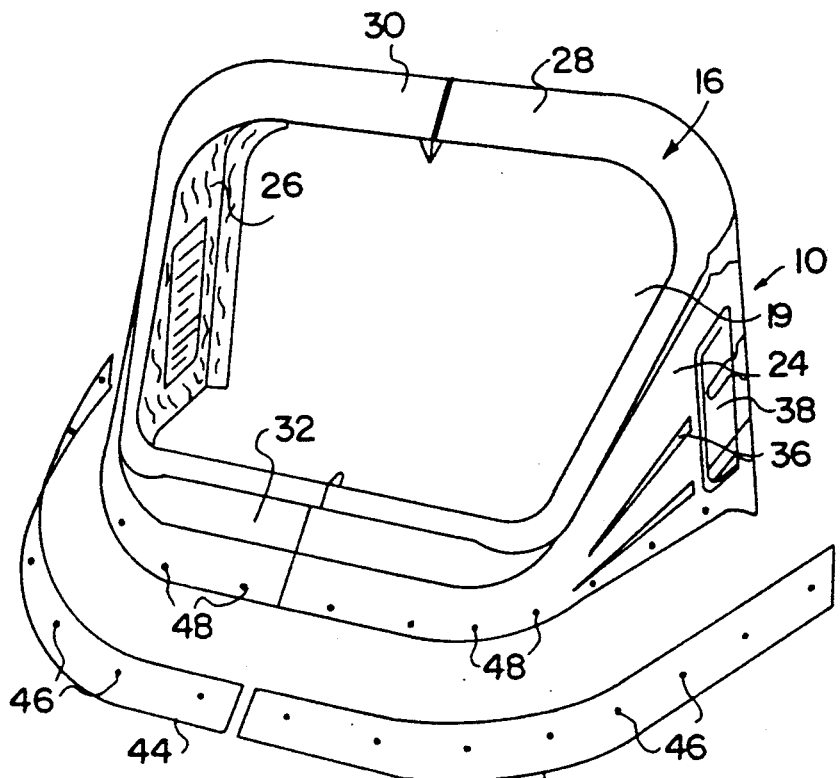
FIG. 6 is an exploded side elevational view of the mounting bracket illustrated in FIGS. 4 and 5.
Figure 7:
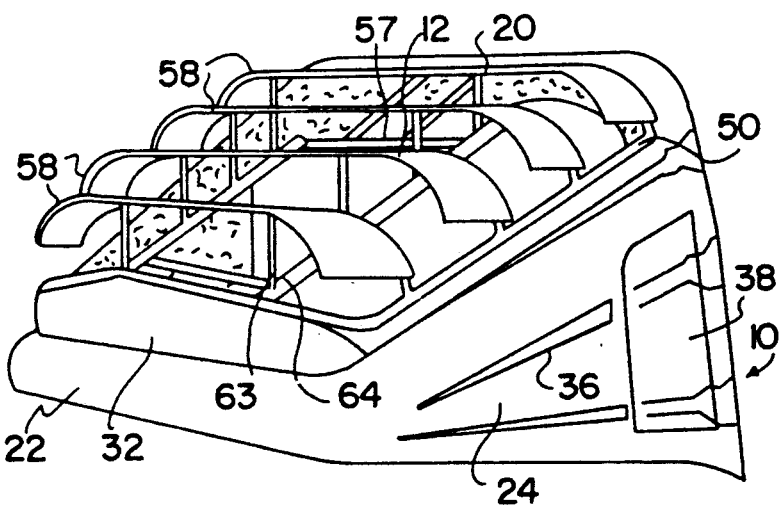
FIG. 7 is a perspective view of the air deflector mounting bracket showing the movable gates in the open position to exert a force on the front of the trailer to decelerate the vehicle.

Attention is directed to the fact that the mounting bracket 10 has a body 16 having a lower edge portion 18 which is adapted to be secured on top of the cab. The rearwardly and upwardly disposed opening 19 is defined by the upper and lower members 20 and 22 as illustrated in FIGS. 1, 3, and 4, and by the oppositely disposed portions 24 and 26 as seen in FIGS. 4, 5 and 6, and the body 16 is divided into first and second oppositely disposed sections 28 and 30 which are joined substantially midway of the upper portion 20 and the lower portion 22.

In the preferred embodiment the mounting bracket 10 is provided on its lower face with a spoiler 32 extending substantially the full length of the lower edge 34 of the opening 17. The spoiler 32 of FIG. 5 directs the air flow over the leading edge of the air deflector to avoid any drag that might otherwise be generated in the area where the leading edge of the air deflector engages the mounting bracket 10.

Also the side portions 24 and 26 as seen in FIGS. 4, 5, 6 and 7, can be provided with a system of stabilizer fins 36 as seen in FIGS. 4, 5, 6 and 7 to straighten out the air flowing around the sides of the mounting bracket. The fins 36 also serve to stabilize the air collected by the doors 38 provided in the side portions 24 and 26. The doors 38 are hinged along their back sides to open up and deflect air from along the sides 24 and 26 to cause more air to be deflected inwardly to impinge on the front face b of the cargo carrying trailer units.

The mechanisms illustrated in FIGS. 10 and 11 are operable to actuate the gates 38 to impinge and scoop up air to add to the braking effort of the air actuated braking system. When the brakes are released the gates 38 close.

FIG. 6 shows the manner in which the mounting bracket 10 is provided with a contouring jacket 44 which may be secured to the lower edge portion 16 of the bracket 10 to adapt the mounting bracket 10 to the variable contours of different cab units to which it is desired to mount the bracket 10.

As illustrated in FIG. 5 the jacket 44 can be provided in two sections and holes 46 designed to register with holes 48 in the body 16 for receiving releasable fasteners for securing the mounting bracket 10 to various cabs of different tractor vehicles.

As stated previously herein, the mounting bracket 10 can support and receive the movable gates 12 as illustrated in FIG. 1 to open up together with the side gates to exert the air flow at road speeds to impinge on the front face b of the cargo carrying trailer to increase the braking effort exerted by the wheel brakes to reduce the speed of the rig.

Figure 9:
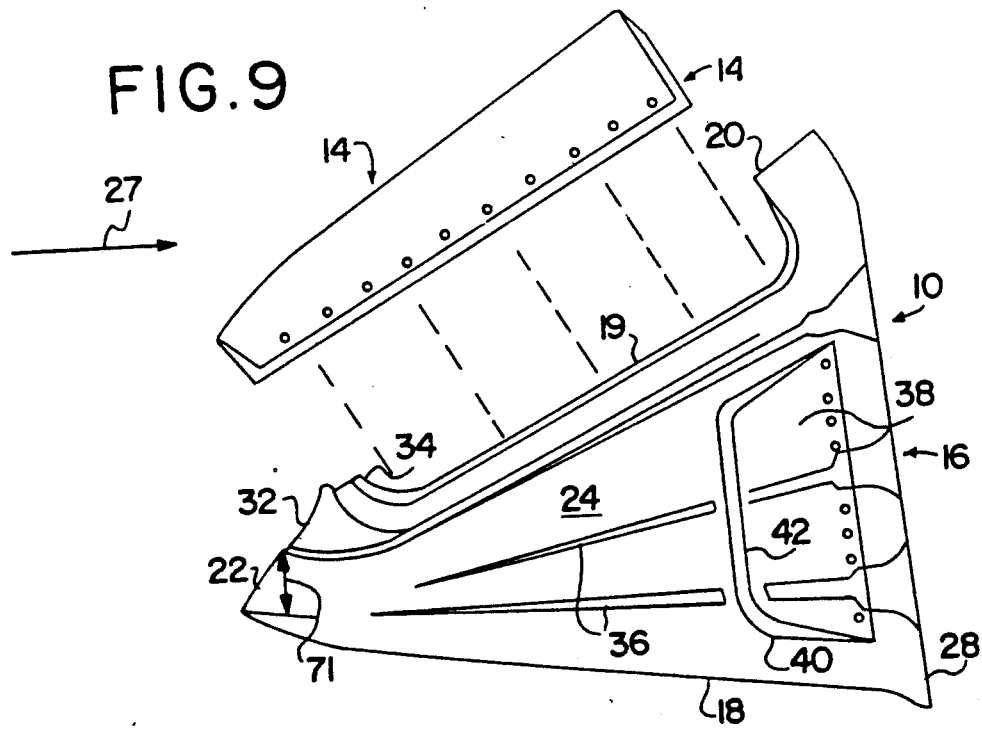
FIG. 9 is a view similar to FIG. 8 wherein a single air deflector panel is substituted for the movable gates disclosed in FIG. 7.

If it is desired to merely reduce the resistance of the travel of the tractor-trailer assembly the unit 14 as illustrated in FIG. 9 may be applied as a fixed element to the mounting bracket 10 to deflect the air flowing over the tractor and trailer units and deflecting it to increase the efficiency of of travel at the road speeds.

It will thus be apparent that for economical operation a trucking organization can apply the mounting bracket 10 with the solid fairing 14 of FIG. 9, and then at a later date apply the hinged gates as shown in FIGS. 1, 3, and 6 to assist in the braking effort of the wheel brakes.

The braking device 12 comprises a frame 50 including an outer portion which is mounted in the central opening 19. The upper portion of the frame 50 includes an upper portion 52 and a lower portion 53 and a pair of side wing portions 54 and 55 to provide a plurality of variable inlet door openings 57 are defined by the frame 50.

Pivotally mounted in each of the openings 57 in the central opening 19 is a variable inlet door 58 which adjustably closes the openings 57 in the central opening 19. Each of the doors 58 is hingedly mounted at the top and is operably connected to the wheel brakes of the vehicle to open when the wheel brakes are applied. Each of the doors 58 is operably connected with a hinge 59, which if desired can be a hinge of the piano type to provide a strong hinged section that is movable between the closed position of FIGS. 1 and 3 to the open position shown in FIG. 7. When the doors 58 are opened the full air dependent on the speed of the vehicle is directed through the openings 57 to impact against the front face b of the trailer A, thereby exerting the maximum force dependent on the speed of the vehicle tractor-trailer. It will, of course, be understood that the maximum braking force will be exerted on the front face b of the trailer A when the gates are in the fully open position. The unit 10 is made of strong light weight material such as aluminum of sufficient thickness to provide a desired margin of safety above the anticipated forces to be exerted thereon.

Referring now to FIG. 10 it will be noted that when the wheel brakes are applied the piston rod 61 is extended in the cylinder 60 to the position illustrated in FIG. 10 whereupon the linkage consisting of the links 62, 63, and 64 are actuated to move the gates 58 to the open position illustrated in FIG. 10. The air flow through which the truck-trailer is passing then flows through the open gates 58 to impinge on the front surface b of the cargo carrying trailer A to exert a retarding or braking force to assist the wheel brakes in decelerating the truck and trailer vehicle.

When the brakes are released the piston rod 61 is projected back into the cylinder 60 to actuate the linkage 64, 62, and 63 to close the doors 58 whereupon the air flows over the mounting bracket 10 with minimal resistance being exerted on the front surface b of the trailer A.

Figure 8:
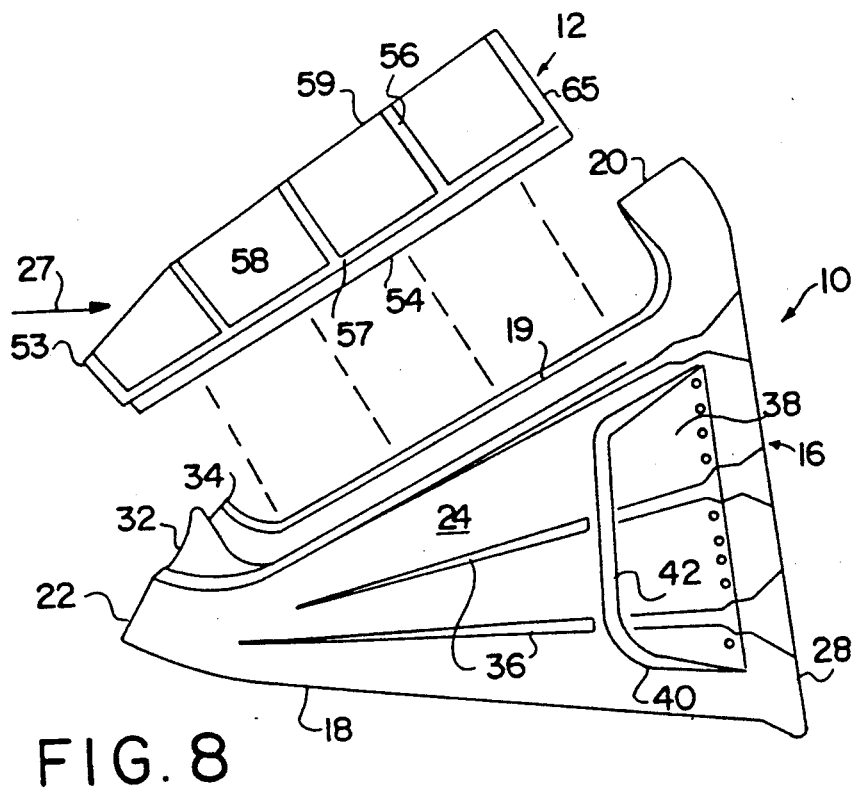
FIG. 8 is an exploded side elevational view illustrating the attachment of the air deflector panel to the cab of the tractor unit.

Referring now to FIG. 9 the air through which the tractor-trailer unit is moving is represented by the line 27. The angle of attack of the leading portion of the body 22 is disposed at approximately a 65 degree angle of attack of the air flow as illustrated at 27 in FIG. 8. The spoiler 32 defines a frontal surface disposed at an angle of approximately 70 degrees relative to the angle of attack represented by the angle of attack 27 to direct the air flow over the lower portion of the air deflector means.

I claim:

1. An air deflector mounting bracket for mounting an air deflector means on a vehicle whereby said mounting bracket and deflector means serve to intercept the air flow on said vehicle during travel and redirect said air flow around aerodynamically inefficient surfaces of said vehicle to reduce drag on said vehicle, said mounting bracket comprising a body provided with a forwardly and upwardly disposed opening for closely receiving said air deflector means, said body including upper and lower portions and opposite side portions framing said opening in said body, and a lower edge portion for engaging said vehicle, wherein said mounting bracket is provided with a variable contouring jacket for adapting said bracket for mounting on vehicles having differing body contours, said jacket having an upper edge portion for engaging said lower edge portion of said body and having a lower edge portion for engaging said vehicle.

2. An air deflector system for mounting on a vehicle to intercept the air flow encountering said vehicle during travel and redirecting said air flow around aerodynamically inefficient surfaces of said vehicle, said air deflector system comprising:

an air deflector mounting bracket, said mounting bracket having a body provided with a forwardly and upwardly disposed opening, said body including upper and lower portions and opposite side portions framing said opening in said body, and a lower edge portion for engaging said vehicle; and air deflector means for being closely received in said opening of said body, wherein said air deflector means comprises an auxiliary air braking device, said braking device including:

a frame including an outer frame portion for engaging said body of said mounting bracket about the perimeter of said opening of said body, said frame defining at least one variable inlet door opening;

at least one variable inlet door secured to said frame so as to serve as a closure for said variable inlet door opening, said at least one variable inlet door being movable between closed and opened positions such that said drag is reduced when said at least one variable inlet door is closed and said drag is increased when said at least one variable inlet door is open due to the air flow passing through said variable inlet door opening encountering said aerodynamically inefficient surfaces of said vehicle;

actuator means for selectively opening and closing said at least one variable inlet door, wherein said outer frame of said braking device includes upper and lower frame portions and a pair of oppositely disposed side portions, and said frame including at least one rib extending between said side portions such that said frame defines a plurality of variable inlet door openings, and wherein said braking device is provided with a plurality of said variable inlet doors, one said variable inlet door being operatively associated with each said variable inlet door opening, wherein one said variable inlet door is pivotally secured to said upper portion of said outer frame at least another said door is pivotally secured to said rib.

3. An air deflector system for mounting on a vehicle to intercept the air flow encountering said vehicle during travel and redirecting said air flow around aerodynamically inefficient surfaces of said vehicle, said air deflector system comprising:

an air deflector mounting bracket, said mounting bracket having a body provided with a forwardly and upwardly disposed opening, said body including upper and lower portions and opposite side portions framing said opening in said body, and a lower edge portion for engaging said vehicle;

air deflector means for being closely received in said opening of said body, wherein said air deflector means comprises an auxiliary air braking device, said braking device including:

a frame including an outer frame portion for engaging said body of said mounting bracket about the perimeter of said opening of said body, said frame defining at least one variable inlet door opening;

at least one variable inlet door secured to said frame so as to serve as a closure for said variable inlet door opening, said at least one variable inlet door being movable between closed and opened positions such that said drag is reduced when said at least one variable inlet door is closed and said drag is increased when said at least one variable inlet door is open due to the air flow passing through said variable inlet door opening encountering said aerodynamically inefficient surfaces of said vehicle;

actuator means for selectively opening and closing said at least one variable inlet door, wherein said outer frame of said braking device includes upper and lower frame portions and a pair of oppositely disposed side portions, and said frame including at least one rib extending between said side portions such that said frame defines a plurality of variable inlet door openings, and wherein said braking device is provided with a plurality of said variable inlet doors, one said variable inlet door being operatively associated with each said variable inlet door opening, wherein said outer frame defines a mounting flange for engaging and being secured to said body of said bracket proximate said perimeter of said opening of said body to facilitate the mounting of said braking device.

4. An air deflector system for mounting on a vehicle to intercept the air flow encountering said vehicle during travel and redirecting said air flow around aerodynamically inefficient surfaces of said vehicle, said air deflector system comprising:

an air deflector mounting bracket, said mounting bracket having a body provided with a forwardly and upwardly disposed opening, said body including upper and lower portions and opposite side portions framing said opening in said body, and a lower edge portion for engaging said vehicle;

air deflector means for being closely received in said opening of said body, wherein said air deflector means comprises an auxiliary air braking device, said braking device including:

a frame including an outer frame portion for engaging said body of said mounting bracket about the perimeter of said opening of said body, said frame defining at least one variable inlet door opening;

at least one variable inlet door secured to said frame so as to serve as a closure for said variable inlet door opening, said at least one variable inlet door being movable between closed and opened positions such that said drag is reduced when said at least one variable inlet door is closed and said drag is increased when said at least one variable inlet door is open due to the air flow passing through said variable inlet door opening encountering said aerodynamically inefficient surfaces of said vehicle;

actuator means for selectively opening and closing said at least one variable inlet door, wherein said at least one variable inlet door is pivotally secured to said frame, wherein said upper and lower portions of said outer frame, said side portions of said frame and said rib define T-shaped cross-sections.

5. An air deflector system for mounting on a vehicle to intercept the air flow encountering said vehicle during travel and redirecting said air flow around aerodynamically inefficient surfaces of said vehicle, said air deflector system comprising:

an air deflector mounting bracket, said mounting bracket having a body provided with a forwardly and upwardly disposed opening, said body including upper and lower portions and opposite side portions framing said opening in said body, and a lower edge portion for engaging said vehicle;

air deflector means for being closely received in said opening of said body, wherein said air deflector means comprises an auxiliary air braking device, said braking device including:

a frame including an outer frame portion for engaging said body of said mounting bracket about the perimeter of said opening of said body, said frame defining at least one variable inlet door opening;

at least one variable inlet door secured to said frame so as to serve as a closure for said variable inlet door opening, said at least one variable inlet door being movable between closed and opened positions such that said drag is reduced when said at least one variable inlet door is closed and said drag is increased when said at least one variable inlet door is open due to the air flow passing through said variable inlet door opening encountering said aerodynamically inefficient surfaces of said vehicle;

actuator means for selectively opening and closing said at least one variable inlet door, wherein said outer frame of said braking device includes upper and lower frame portions and a pair of oppositely disposed side portions, and said frame including at least one rib extending between said side portions such that said frame defines a plurality of variable inlet door openings, and wherein said braking device is provided with a plurality of said variable inlet doors, one said variable inlet door being operatively associated with each said variable inlet door opening, wherein one said variable inlet door is pivotally secured to said upper portion of said outer frame and at least another said door is pivotally secured to said rib, wherein said actuator means includes a fluid actuated cylinder having a reciprocating actuator arm, and includes a linkage for communicating the selective movement of said actuator arm to said variable inlet doors so as to selectively open and close said doors.

6. An air deflector system for mounting on a tractor-trailer vehicle to intercept the air flow passing said vehicle during travel and redirecting said air flow around the trailer, said air deflector system comprising: an air deflector mounting bracket, said mounting bracket having a body provided with a forwardly and upwardly disposed opening, said body including upper and lower portions and opposite side portions framing said opening in said body, and a lower edge portion for engaging said vehicle, and air deflector means for being closely received in said opening of said body, and wherein said air; deflector means comprises an auxiliary air braking device, said braking device including, a frame including an outer frame portion for engaging said body of said mounting bracket about the perimeter of said opening of said body, said frame defining at least one variable inlet door opening, at least one variable inlet door secured to said frame so as to serve as a closure for said variable inlet door opening, said one of said 20 and 21, at least one variable inlet door being movable between closed and opened positions such that said drag is reduced when said one of said variable inlet door is closed and said drag is increased when said one of said variable inlet door is open due to the air flow passing through said variable inlet door opening and contacting a face of the trailer of said vehicle and actuator means for selectively opening and closing said at least one variable inlet door, the outer frame of said braking device includes upper and lower frame portions and a pair of oppositely disposed side portions, and said frame including at least one rib extending between said side portions such that said frame defines a plurality of variable inlet door openings, and wherein said braking device is provided with a plurality of said variable inlet doors, one said variable inlet door being operatively associated with each said variable inlet door openings, and one of said variable inlet doors is pivotally secured to said upper portion of said outer frame and at least one other of said doors is pivotally secured to said rib.

7. An air deflector system for mounting on a truck-trailer vehicle to intercept the air flow passing said vehicle during travel and redirecting said air flow around the trailer of said vehicle, said air deflector system comprising: an air deflector mounting bracket, said mounting bracket having a body provided with a forwardly and upwardly disposed opening, said body including upper and lower portions and opposite side portions framing said opening in said body, a lower edge portion for engaging said vehicle, and air deflector means for being closely received in said opening of said body, a frame including an outer frame portion for engaging said body of said mounting bracket about the perimeter of said opening of said body, said frame defining a plurality of variable inlet door opening, at least one variable inlet door secured to said frame so a to serve as a closure for said at least one variable inlet door opening, said at least one variable inlet door being movable between closed and opened positions such that said drag is reduced when said variable inlet door is closed and said drag is increased when said at least one variable inlet door is open due to the air flow passing through said variable inlet door opening encountering said trailer of said vehicle, actuator means for selectively opening and closing said at least one variable inlet door, the outer frame of said braking device includes upper and lower frame portions and a pair of oppositely disposed side portions, and said frame including at least one rib extending between said side portions such that said frame defines a plurality of variable inlet door openings, and wherein said braking device is provided with a plurality of said variable inlet doors, one of said variable inlet doors being operatively associated with each said variable inlet door opening, wherein said outer frame defines a mounting flange for engaging and being secured to said body of said bracket proximate said perimeter of said opening of said body to facilitate the mounting of said braking device.

8. An air deflector system for mounting on a tractor-trailer vehicle to intercept the air flow passing said vehicle during travel and redirecting said air flow around the trailer, said air deflector system comprising: an air deflector mounting bracket, said mounting bracket having a body provided with a forwardly and upwardly disposed opening, said body including upper and lower portions and opposite side portions framing said opening in said body, and a lower edge portion for engaging said vehicle, and air deflector means for being closely received in said opening of said body, and wherein said air deflector means comprises an auxiliary air braking device, said braking device including, a frame including an outer frame portion for engaging said body of said mounting bracket about the perimeter of said opening of said body, said frame defining at least one variable inlet door opening, at least one variable inlet door is secured to said frame so as to serve as a closure for said at least one variable inlet door opening, said at least one variable inlet door being movable between closed and opened positions such that said drag is reduced when said at least one variable inlet door is closed and said drag is increased when said at least one variable inlet door is open due to the air flow passing through said at least one variable inlet door opening and contacting a face of the trailer of said vehicle, and actuator means for selectively opening and closing said at least one inlet door, and wherein said outer frame of said braking device includes upper and lower frame portions and a pair of oppositely disposed side portions, one said frame including at least one rib extending between said side portions such that said frame defines a plurality of variable inlet door openings, and wherein said braking device is provided with a plurality of said variable inlet doors, one said variable inlet door being operatively associated with each said variable inlet door opening and wherein said upper and lower portions of said outer frame and said side portions of said rib define T-shaped cross sections.

* * * * *